United States Patent [19]

Kapuscinski et al.

[11] Patent Number: 4,764,304
[45] Date of Patent: Aug. 16, 1988

[54] HYDROCARBON COMPOSITIONS CONTAINING POLYOLEFIN GRAFT POLYMERS

[75] Inventors: Maria M. Kapuscinski, Carmel; Christopher S. Liu, Poughkeepsie, both of N.Y.; William P. Hart, Freehold, N.J.

[73] Assignee: Texaco Inc., White Plains, N.Y.

[21] Appl. No.: 911,612

[22] Filed: Sep. 25, 1986

[51] Int. Cl.$^4$ .......................................... C10M 149/00
[52] U.S. Cl. ............................... 252/51.5 A; 525/131; 525/331.7; 252/51.5 R
[58] Field of Search ..................... 252/51.5 A, 51.5 R; 525/131

[56] References Cited

U.S. PATENT DOCUMENTS

| | | | |
|---|---|---|---|
| 4,292,185 | 9/1981 | Bollinger | 252/51.5 A |
| 4,440,659 | 3/1984 | Chen et al. | 252/51.5 A |
| 4,500,440 | 2/1985 | Kaufman et al. | 252/51.5 A |
| 4,505,834 | 3/1985 | Papay et al. | 252/51.5 A |

*Primary Examiner*—Jacqueline V. Howard
*Attorney, Agent, or Firm*—Robert A. Kulason; James J. O'Loughlin; Carl G. Seutter

[57] ABSTRACT

Dispersant viscosity index improvers for lubricating oils contain an EPR or EPT polymer onto which has been graft polymerized isocyanatoethyl methacrylate and thereafter reacted with N-methyl piperazine.

11 Claims, No Drawings

HYDROCARBON COMPOSITIONS CONTAINING POLYOLEFIN GRAFT POLYMERS

FIELD OF THE INVENTION

This invention relates to hydrocarbons including hydrocarbon lubricating oils. More particularly, it relates to hydrocarbons which contain polymers which permit attainment of improved properties.

BACKGROUND OF THE INVENTION

As is well known to those skilled in the art, hydrocarbon lubricating oils may be formulated, as by addition of various additives, to improve their properties.

In the case of lubricating oils, typified by those employed in railway, automotive, aircraft, marine, etc. service, it is found that they become degraded during use due inter alia to formation of sludge which may be generated by deterioration of the oil or by introduction of undesirable components from other sources including the fuel or the combustion air. In order to maintain and improve the properties of the lubricating oil, various additives have heretofore been provided; and these have been intended to improve the viscosity index, dispersancy, oxidative stability, etc. It is an object of this invention to provide an additive system which permits attainment of improved hydrocarbons. Other objects will be apparent to those skilled in the art.

STATEMENT OF THE INVENTION

In accordance with certain of its aspects, this invention is directed to a method of preparing a substantially linear polymer composition containing a carbon-carbon backbone which comprises forming a reaction mixture containing a substantially linear, carbon-carbon backbone polymer, graft polymerizing, onto said substantially linear carbon-carbon backbone polymer, under graft polymerization reaction conditions in the presence of graft polymerization catalyst, a graft monomer containing an ethylenically unsaturated carbon-carbon double bond and an isocyanate group thereby forming a graft polymer bearing a pendant isocyanate group and recovering said graft polymer bearing said pendant isocyanate groups.

DESCRIPTION OF THE INVENTION

The Graft Functional Monomer

It is a feature of the process of this invention that the graft functional monomers which may be employed (within a polymeric configuration) may be characterized by the presence of units containing an ethylenically unsaturated carbon-carbon double bond and an isocyanate group. Although the graft monomer may contain more than one ethylenically unsaturated carbon-carbon double bond or isocyanato group, in a preferred embodiment it may contain one of each. Graft monomers containing more than one ethylenically unsaturated carbon-carbon double bond are much less preferred because of the high probability of cross-linking during subsequent reaction.

In one aspect of this invention, the preferred graft functional monomer maybe characterized by the formula

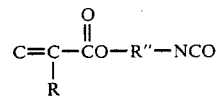

In the above formula, $R''$ may be a hydrocarbon group selected from the group consisting of alkylene, aralkylene, cycloalkylene, arylene, and alkarylene, including such radicals when inertly substituted. When $R''$ is alkylene, it may typically be methylene, ethylene, n-propylene, iso-propylene, n-butylene, i-butylene, sec-butylene, amylene, octylene, decylene, octadecylene, etc. When $R''$ is aralkylene, it may typically be benzylene, betaphenylethylene, etc. When $R''$ is cycloalkylene it may typically be cyclohexylene, cycloheptylene, cyclooctylene, 2-methylchloheptylene, 3-butylcyclohexylene, 3-methylcyclohexylene, etc. When $R''$ is arylene, it may typically be phenylene, naphthylene, etc. When $R''$ is alkarylene, it may typically be tolylene, xylylene, etc. $R''$ may be inertly substituted i.e. it may bear a non-reactive substituent such as alkyl, aryl, cycloalkyl, ether, etc. Typically inertly substituted $R''$ groups may include 2-ethoxyethylene, carboethoxymethylene, 4-methyl cyclohexylene, etc. The preferred $R''$ groups may be lower alkylene, i.e. $C_1$–$C_{10}$ alkylene, groups including eg methylene, ethylene, n-propylene, butylene, amylene, hexylene, octylene, decylene, etc. $R''$ may preferably be ethylene —$CH_2CH_2$—.

In the above compound, R may be a hydrocarbon selected from the group consisting of alkyl, aralkyl, cycloalkyl, aryl, and alkaryl, including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is aralkyl, it may typically be benzyl, betaphenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. R may be inertly substituted i.e. it may bear a non-reactive substituent such as alkyl, aryl, cycloalkyl, ether, etc. Typically inertly substituted R groups may include 2-ethoxyethyl, carboethoxymethyl, 4-methyl cyclohexyl, etc. The preferred R groups may be lower alkyl, i.e. $C_1$–$C_{10}$ alkyl, groups including eg methyl, ethyl, n-propyl, i-propyl, butyls, amyls, hexyls, octyls, decyls, etc. R may preferably be methyl.

The graft functional monomer may be an isocyanate of an unsaturated hydrocarbon typified by:

TABLE

| | |
|---|---|
| allyl | isocyanate |
| buten-2-yl | isocyanate |
| buten-3-yl | isocyanate |
| p-isocyanato | styrene |
| 2,6-diisocyanato | styrene |

The functional monomer may be an isocyanate of an unsaturated acid (as acid or as ester) typified by:

TABLE 4-isocyanato-butene-2-carboxylic acid.

The preferred graft functional monomers may be isocyanatohydrocarbyl esters of unsaturated monocarboxylic acids, typified by:

TABLE

| | |
|---|---|
| isocyanatoethyl | methacrylate |
| isocyanatomethyl | acrylate |
| omega-isocyanato-n-butyl | methacrylate |

The preferred graft functional monomer may be isocyanatoethyl methacrylate.

It is a feature of the process of this invention that the graft functional monomers may be grafted onto carbon-carbon backbone polymers,

THE BACKBONE POLYMER

Typical of the charge backbone polymers onto which the graft functional monomer may be grafted are those which include an oil-soluble, substantially linear, carbon-carbon backbone polymer. Typical carbon-carbon backbone polymers, prepared from monomers bearing an ethylenically unsaturated polymerizable double bond, which may be employed include homopolymers or copolymers prepared from monomer containing the grouping

including

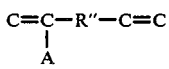

wherein A may be a hydrogen, hydrocarbon such as alkyl, aryl (particularly phenyl) etc., —OOCR typified by acetate or less preferred acyloxy (typified by —OOCR); halide, etc. R" may be divalent hydrocarbon typified by alkylene, alkarylene, cycloalkylene, arylene, etc. as hereinabove specified Illustrative of such monomers may be acrylates or methacrylates; vinyl halides (such as vinyl chloride); styrene; olefins such as propylene, butylene, etc.; vinyl acetate; dienes such as butadiene, isoprene, hexadiene, ethylidene norborene, etc. Homopolymers of olefins (such as polypropylene, polybutylene, etc.), dienes (such as hydrogenated polyisoprene), or copolymers of ethylene, with e.g. propylene, butylene and higher olefins, styrene, isoprene and/or butadiene may be employed.

The preferred substantially linear carbon-carbon backbone charge polymers include those selected from the group consisting of ethylene-propylene copolymers (EPM or EPR) and ethylene-propylene-diene third monomer terpolymers (EPDM or EPT).

When the charge polymer is an ethylene-propylene copolymer (EPM), it may be formed by copolymerization of ethylene and propylene under known conditions preferably Ziegler-Natta reaction conditions. The preferred EPM copolymers contain units derived from the ethylene in amount of 40–70 mole %, preferably 50–60 mole %, say 55 mole %, the remainder being derived from propylene.

The molecular weight $\overline{M}_n$ of the EPM copolymers which may be employed may be 10,000–1,000,000, preferably 20,000–200,000 say 135,000. The molecular weight distribution may be characterized by a polydispersity index $\overline{M}_w/\overline{M}_n$ of less than about 15, preferably 1.2–10, say 1.6.

Illustrative EPM copolymers which may be employed in practice of the process of this invention may be those set forth in the following table, the first listed being preferred:

TABLE

A. The Epsyn brand of EPM marketed by Copolymer Rubber and Chemical Corporation containing 55 mole % of units derived from ethylene and 45 mole % of units derived from propylene, having a molecular weight $\overline{M}_n$ of 135,000 and a polydispersity index of 1.6.

B. The Epcar 505 brand of EPM marketed by B. F. Goodrich Co., containing 50 mole % of units derived from ethylene and 50 mole % of units derived from propylene and having a $\overline{M}_n$ of 25,000 and a polydispersity index of 2.5.

C. The Esprene brand of EPR marketed by Sumitomo Chemical Co., containing 55 mole % of units derived from ethylene and 45 mole % of units derived from propylene and having a $\overline{M}_n$ of 25,000 and polydispersity index of 2.5;

When the charge polymer is an ethylene-propylene-diene terpolymer (EPT or EPDM), it may be formed by copolymerization of ethylene, propylene, and diene monomers. The diene third monomer is commonly a non-conjugated diene typified by dicyclopentadiene; 1,4-hexadiene; or ethylidene norbornene. Polymerization is effected under known conditions generally comparable to those employed in preparing the EPM products. The preferred terpolymers contain units derived from ethylene in amount of 40–70 mole %, preferably 50–65 mole %, say 60 mole % and units derived from propylene in amount of 20–60 mole %, preferably 30–50 mole %, say 38 mole % and units derived from diene third monomer in amount of 0.5–15 mole %, preferably 1–10 mole %, say 2 mole %. The molecular weight $\overline{M}_n$ of the terpolymers may typically be 10,000–1,000,000, preferably 20,000–200,000, say 120,000. Molecular weight distribution of the useful polymers is preferably narrow viz a polydispersity index of typically less than 15, preferably 1.5–10, say about 2.2.

Illustrative EPT terpolymers which may be employed in practice of the process of this invention may be those set forth in the following table, the first listed being preferred:

TABLE

A. The Epsyn 4006 brand of EPT marketed by Copolymer Rubber and Chemical Corp., containing 58 mole % of units derived from ethylene, 40 mole % of units derived from propylene, and 2 mole % of units derived from ethylidene norbornene and having a polydispersity index of 2.2. and a molecular weight of 120,000.

B. The Ortholeum 5655 brand of EPT marketed by DuPont containing 62 mole % of units derived from ethylene, 36 mole % of units derived from propylene, and 2 mole % of units derived from 1,4-hexadiene and having a $\overline{M}_n$ of 75,000 and a poly dispersity index of 2.

C. The Ortholeum 2052 brand of EPT marketed by DuPont containing 62 mole % of units derived from ethylene, 36 mole % of units derived from propylene, and 2 mole % of units derived from 1,4-hexadiene and having a $\overline{M}_n$ of 35,000 and a polydispersity index of 2.

D. The Royalene brand of EPT marketed by Uniroyal containing 60 mole % of units derived from ethylene, 37 mole % of units derived from propylene, and 3 mole % of units derived from dicyclopentadiene and having a $\overline{M}_n$ of 100,000 and a polydispersity index of 2.5.

E. The Epsyn 40A brand of EPT marketed by Copolymer Rubber and Chemical Corp. containing 60 mole % of units derived from ethylene, 37 mole % of units derived from propylene, and 3 mole % of units derived from ethylidene norbornene and having a $\overline{M}_n$ of 140,000 and a polydispersity index of 2.

The EPM and EPT polymers may contain minor portions (typically less than about 30%) of other units derived from other copolymerizable monomers.

THE GRAFTING REACTION

In practice of this process of this invention, 100 parts of charge EPM or EPT may be added to 100-1000 parts, say 300 parts of diluent-solvent. Typically diluent-solvent may be a hydrocarbon solvent such as mineral oil, n-hexane, n-heptane, or tetrahydrofuran. Preferred solvent may be a commercial hexane containing principally hexane isomers or a commercial mineral grafting oil. Reaction mixture may then be heated under nitrogen to reaction conditions of 60° C.-180° C., preferably 150° C.-170° C., say 155° C. When n-hexane or other low boiling solvent is used, reaction is carried out in pressure reactor at 15-300 psig, preferably 180-220 psig, say 200 psig.

Graft monomer, typically isocyanoethyl methacrylate, is admitted in amount of 1-40 parts, say 5 parts, as a solution in 0-20 parts, say 5 parts of diluent-solvent. There is also added a solution in diluent-solvent of free radical initiator. Typical free radical initiators (graft polymerization catalysts) may include dicumyl peroxide, di-t-butyl peroxide, benzoyl peroxide, di-isopropyl peroxide, azobisisobutyronitrile, etc. The solvent is preferably the same as that in which the EPM or EPT is dissolved. The initiator may be added in amount of 0.2-40 parts, say 2 part in 0.8-120 parts, say 2 parts of solvent.

The reaction is carried out at a temperature at least as high as the decomposition temperature of the initiator, typically 60° C. or higher.

The grafting reaction is typically carried out at graft polymerization conditions of 60° C.-180° C., say 155° C. during which time bonding of the graft functional monomer onto the base EPM or EPT polymer occurs.

Typically the reaction may proceed as follows:

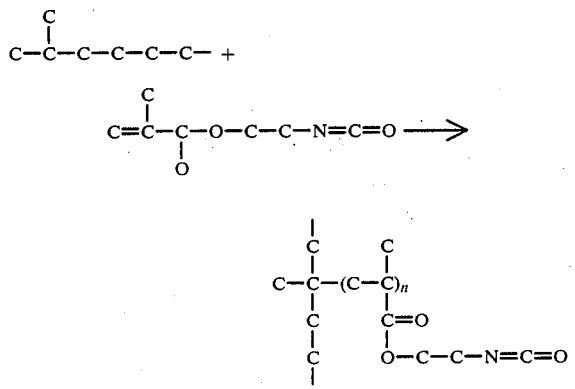

wherein n is $\geq 1$

The product graft polymer may be characterized by the presence of pendant isocyanate groups —NCO bonded to the polymer backbone through the residue of the graft monomer, the latter being bonded to the polymer backbone through one of the carbon atoms which formed the ethylenically unsaturated double bond.

Typically the graft product polymer may by contain 0.1-20, say 0.4 units derived from graft monomer per 1000 carbon atoms of the charge backbone polymer.

THE AMINE REACTANT

In practice of the process of this invention, the graft polymer bearing pendant isocyanate groups may be reacted with an amine containing at least one non-tertiary nitrogen atom. The amine may be characterized by the formula R* R** NH.

In the above compound, R* may be hydrogen or a hydrocarbon group selected from the group consisting of alkyl, aralkyl, cycloalkyl, aryl, and alkaryl, including such radicals when inertly substituted. When R* is alkyl, it may typically be methyl, ethyl, n-propyl, iso-propyl, n-butyl, i-butyl, sec-butyl, amyl, octyl, decyl, octadecyl, etc. When R* is a aralkyl, it may typically be benzyl, beta-phenylethyl, etc. When R* is cycloalkyl, it may typically be cyclohexyl, cycloheptyl, cyclooctyl, 2-methylcycloheptyl, 3-butylcyclohexyl, 3-methylcyclohexyl, etc. When R* is aryl, it may typically be phenyl, naphthyl, etc. When R* is alkaryl, it may typically be tolyl, xylyl, etc. R* may be inertly substituted i.e. it may bear a non-reactive substituent such as alkyl, aryl, cycloalkyl, ether, etc. Typically inertly substituted R* groups may include 2-ethoxyethyl, carboethoxymethyl, 4-methyl cyclohexyl, etc. The preferred R* groups may be hydrogen or lower alkyl, i.e. $C_1$-$C_{10}$ alkyl, groups including eg methyl, ethyl, n-propyl, i-propyl, butyls, amyls, hexyls, octyls, decyls, etc. R** may be hydrogen or selected from the same group as R*.

R* and R** may be joined together to form a carbocyclic ring or (through a hetero atom such as nitrogen, sulfur, or oxygen) a heterocyclic ring which may include other heteroatoms. Typical of such compounds may be morpholine(s), pyrimidine(s), picoline(s), etc.

When the amine R* R**NH is a primary amine, it may typically be one of the following:

TABLE

N-(3-aminopropyl)morpholine
N-(3-aminopropyl)-2-pipecoline
N-(3-aminopropyl)pyrrolidone
2-aminobenzothiazole
2-aminopyrimidine
2-amino-3-picoline
4-amino-2,6-dimethyl pyrimidine
N,N-dimethylaminopropylamine
2,5-dimethyl aniline When the amine is a secondary amine, it may typically be one of the following:

TABLE

N-methylpiperazine
morpholine
pyrrolidine
2,6-dimethylmorpholine
N-(2-hydroxyethyl)piperazine
phenothiazine It is preferred however that the amine be a piperazine, preferably, N-methyl piperazine.

THE AMIDIZATION REACTION

Amidization may be carried out by adding the graft polymer containing isocyanate groups to a reaction vessel together with inert-diluent solvent. In the preferred embodiment, reaction may be carried out in the same solvent and in the same reaction medium as that in which the polymer is dissolved.

Amine, typically N-methyl piperazine, is added to the reaction vessel. The amount of amine added is preferably 0.1–5 moles, say 1.2 moles per mole of isocyanate group bonded to the polymer. Typically this may correspond to 0.01–0.5 moles, say 0.039 moles of amine per 100 g of polymer.

The amidization reaction is carried out over 0.1–10 hours, say 2 hours at 100° C.–180° C., say 155° C. with agitation. For ease of handling, the final produced may be diluted to form a solution of 4–20 parts, say 9 parts of polymer in 80–95, say 91 parts of mineral oil such as a SUS 100 oil typified by SNO-100. When the product has been prepared in a low-boiling solvent such as hexane, the latter is preferably distilled off.

During the reaction, the following may occur

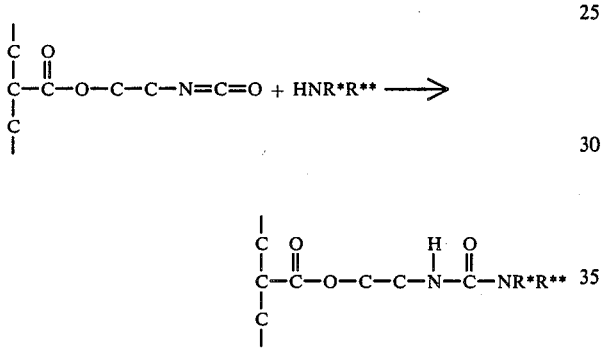

The product is characterized by the fact that the isocyanate group has been amidized to a urea i.e. a substituted urea group.

Illustrative amidized isocyanate graft polymer products may include the following:

TABLE

A. Ethylene-propylene EPR copolymer containing 55 mole % derived from ethylene and 45 mole % derived from propylene ($\overline{M}_n$ 135,000) onto which has been grafted isocyanatoethyl methacrylate to yield graft polymer containing 0.5 moles of isocyanate groups per 1000 carbon atoms of the backbone polymer and which has been thereafter amidized with N-methyl piperazine to yield amidized graft polymer containing 0.4 moles derived from N-methyl piperazine per 1000 carbon atoms of the backbone polymer.

B. Ethylene-propylene EPR copolymer containing 55 mole % derived from ethylene and 45 mole % derived from propylene ($\overline{M}_n$ 135,000) onto which has been grafted isocyanatoethyl methacrylate to yield graft polymer containing 0.5 moles of isocyanato groups per 1000 carbon atoms of the backbone polymer and which has been thereafter amidized with N-(3-aminopropyl)-2-pipecoline to yield amidized polymer containing 0.48 moles derived from N-(3-aminopropyl)-2-pipecoline per 1000 carbon atoms of the backbone polymer.

C. Ethylene-propylene EPR copolymer containing 55 mole % derived from ethylene and 45 mole % derived from propylene ($\overline{M}_n$ of 135,000) onto which has been grafted isocyanatoethyl methacrylate to yield graft polymer containing 0.5 moles of isocyanato groups per 1000 carbon atoms of the backbone polymer and which has been thereafter amidized with N-aminopropylmorpholine to yield amidized polymer containing 0.4 moles derived from N-aminopropylmorpholine per 1000 carbon atoms of the backbone polymer.

It is a feature of this invention that the so-prepared amidized graft polymer may find use in lubricating oils as multifunctional additive (e.g. dispersant, viscosity index improvers etc) when present in effective amount of 0.2–5 w%, preferably 0.4–3 w%, say 0.9 w%.

Lubricating oils in which the multifunctional additives of this invention may find use may include automotive, aircraft, marine, railway, etc. oils; oils used in spark ignition or compression ignition; summer or winter oils; etc. Typically the lubricating oils may be characterized by an ibp of 570° F.–660° F., say 610° F., an ep of 750° F.–1200° F., say 1020° F.; and an API gravity of 25–31, say 29.

A typical standard lubricating oil in which the polymer of this invention may be present may be a standard SAE 5W-30 hydrocarbon motor oil formulation having the following composition:

TABLE

| | W % |
|---|---|
| Base Oil | 82 |
| Viscosity Index Improver (10 w % ethylene-propylene copolymer in 90% inert oil) | 9 |
| Standard Additive Package: Polyisobutenyl ($\overline{M}_n$ 1290) succinimide (dispersant); calcium sulfonate (detergent); Zinc dithiophosphate (anti-wear); di-nonyl diphenyl amine (anti-oxidant); 4,4'-methylene-bis (2,6-di-t-butyl phenol) (antioxidant); | 9 |

Use of the additive of this invention makes it possible to readily increase the viscosity index by 25–40 units, say 35 units and to obtain improved ratings on the tests measuring the dispersancy of the system. The viscosity index is determined by ASTM Test D-445.

Practice of the process of this invention will be apparent to those skilled in the art from the following examples wherein, as elsewhere in this specification, all parts are parts by weight unless otherwise set forth. Control examples are designated by an asterisk.

DESCRIPTION OF THE PREFERRED EMBODIMENTS

EXAMPLE I

In this example which describes the best mode presently known, the charge EPM polymer is the Epsyn brand of polymer of molecular weight $\overline{M}_n$ of 135,000, of polydispersity index of 1.6, and containing 55 mole % of units derived from ethylene and 45 mole % of units derived from propylene.

This charge polymer (100 g) is dissolved in 400 g of SUN-148 brand of mineral oil graft polymerization solvent. Reaction mixture is heated to 155° C. at atmospheric pressure with stirring under nitrogen. There are then added 10 g of a 50 w % solution of 0.325 moles of isocyanatoethyl methacrylate in SUN-148 mineral oil and 8 g of a 25 w % solution of dicumyl peroxide in SUN-148 mineral oil. The mixture is stirred for one hour at 155° C. as the graft polymerization occurs. The graft polymer bearing isocyanate groups is recovered as an 18 w % solution in SUN-148 oil; and it contains 0.4 units derived from isocyanatoethyl methacrylate per 1000 carbon atoms of backbone polymer.

There is then added to the reaction mixture containing graft polymer 3.9 g. (0.039 mole) of N-methyl piperazine in 5 g of SUN-148 mineral oil. The mixture is stirred at 155° C. for two hours as amidization occurs. The amidized product contains 0.35 units derived from M-methyl piperazine per 1000 carbon atoms of the backbone polymer.

There is then added SNO-100 oil to give a solution containing 9 w % polymer which is used as an additive to lubricating oil and for further testing.

EXAMPLE II

The procedure of Example I is followed except that the amount of N-methyl piperazine is increased to 5 g (0.05 moles).

EXAMPLE III

The procedure of Example I is followed except that (in place of 3.9 g of N-methyl piperazine), there is added 5.52 g (0.039 moles) of N-aminopropyl morpholine (APM).

EXAMPLE IV

The procedure of Example I is followed except that (in place of 3.9 g of N-methyl piperazine), there is added 6.0 g (0.039 mole) of 1-(3-aminopropyl)-2-pipecoline (APP).

EXAMPLE V*

In this control example, the procedure of Example I is followed except that no amine is added i.e. the product is not amidized.

Results comparable to those of Example I may be attained if the charge polymer is:

TABLE

| Example | Polymer |
|---|---|
| VI | The Epcar 505 brand of EPM marketed by B. F. Goodrich Co., containing 50 mole % of units derived from ethylene and 50 mole % of units derived from propylene and having a $M_n$ of 25,000 and a polydispersity index of 2.5. |
| VII | The Esprene brand of EPR marketed by Sumitomo Chemical Co., containing 55 mole % of units derived from ethylene and 45 mole % of units derived from propylene and having a $M_n$ of 25,000 and polydispersity index of 2.5; |
| VIII | The Epsyn 4006 brand of EPT marketed by Copolymer containing 58 mole % of units derived from ethylene, 40 mole % of units derived from propylene, and 2 mole % of units derived from ethylidene norbornene and having a polydispersity index of 2.2 and a molecular weight $M_n$ of 120,000. |
| IX | The Ortholeum 5655 brand of EPT marketed by DuPont containing 62 mole % of units derived from ethylene, 36 mole % of units derived from propylene, and 2 mole % of units derived from 1,4-hexadiene and having a $M_n$ of 75,000 and a polydispersity index of 2. |
| X | The Ortholeum 2052 brand of EPT marketed by DuPont containing 62 mole % of units derived from ethylene, 36 mole % of units derived from propylene, and 2 mole % of units derived from 1,4-hexadiene and having a $M_n$ of 35,000 and a polydispersity |

TABLE-continued

| Example | Polymer |
|---|---|
| | index of 2. |
| XI | The Royalene brand of EPT marketed by Uniroyal containing 60 mole % of units derived from ethylene, 37 mole % of units derived from propylene, and 3 mole % of units derived from dicyclopentadiene and having a $M_n$ of 100,000 and a polydispersity index of 2.5. |
| XII | The Epsyn 40A brand of EPT marketed by Copolymer Rubber and Chemical Corp. containing 60 mole % of units derived from ethylene, 37 mole % of units derived from propylene, and 3 mole % of units derived from ethylidene norbornene and having a $M_n$ of 140,000 and a polydispersity index of 2. |

Results comparable to those of Example I may be obtained if the functional graft monomer is:

| Example | Functional Graft Monomer |
|---|---|
| XIII | allyl isocyanate |
| XIV | isocyanatoethyl acrylate |
| XV | isocyanatomethyl acrylate |
| XVI | isocyanatomethyl methacrylate |

The products of Examples I–V* are blended (at 0.9 w% polymer level) into a standard dispersant-free lubricating oil formulation and tested for dispersancy in the Bench VC Test. In the BVCT, disperancy is measured against three standards (excellent, good, poor); and improved dispersancy is evidenced by lower ratings. A rating in the area of (or below) the good standard serves as an indication that the system should be considered as a candidate for further testing.

TABLE

| Example | BVCT RATING | Standards |
|---|---|---|
| I | 32 | 8/28/67 |
| II | 14 | 8/25/60 |
| III | 32 | 6/17/56 |
| IV | 33 | 6/17/56 |
| V* | 86 | 6/29/56 |

From the above Table, it is apparent that the control of Example V* which had not been amidized possessed no dispersant properties. When the product is amidized, as in Examples I–IV, considerable dispersancy is evidenced. In particular, the product of Example II shows evidence of a high degree of dispersancy.

Although this invention has been illustrated by reference to specific embodiments, it will be apparent to those skilled in the art that various changes and modifications may be made which clearly fall within the scope of this invention.

What is claimed is:

1. A lubricating oil composition comprising a major portion of lubricating oil and a minor effective viscosity index improving portion of a substantially linear graft polymer containing a carbon-carbon backbone which comprises a substantially linear carbon-carbon backbone polymer and graft polymerized thereon, under graft polymerization reaction conditions in the presence of graft polymerization catalyst, graft monomer containing an ethylenically unsaturated carbon-carbon double bond and an isocyanate group said isocyanate group, after graft polymerization has been effected, having been amidized by reaction with an amine containing a non-tertiary amino nitrogen atom.

2. A lubricating oil composition as claimed in claim 1 wherein said backbone polymer is a copolymer of ethylene-propylene or a terpolymer of ethylene-propylene-diene terpolymer.

3. A lubricating oil composition as claimed in claim 1 wherein said graft monomer contains the grouping

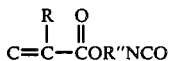

wherein R is hydrogen or an alkyl, alkaryl, aralkyl, cycloalkyl, or aryl hydrocarbon group and R" is an alkylene, aralkylene, alkarylene, cycloalkylene, or arylene hydrocarbon group.

4. A lubricating oil composition as claimed in claim 1 wherein said graft monomer is allyl isocyanate, buten-2-yl isocyanate, buten-3-yl isocyanate, p-isocyanato styrene, or 2,6-diisocyanato styrene.

5. A lubricating oil composition as claimed in claim 1 wherein said amine is R*R**NH wherein R* is hydrogen or alkyl, alkaryl, aralkyl, cycloalkyl, or aryl and R** is alkyl, alkaryl, aralkyl, cycloalkyl, or aryl or R* and R** are joined to form a carbocyclic or heterocyclic ring.

6. A lubricating oil composition as claimed in claim 1 wherein said amine is a heterocyclic amine.

7. A lubricating oil composition as claimed in claim 1 wherein said amine is a primary amine.

8. A lubricating oil composition as claimed in claim 1 wherein said amine is a primary amine containing a pendant primary amino group on, as a nucleus, a morpholine, a pipecoline, a pyrrolidine, a benzothiazole, a pyrimidine, or a picoline.

9. A lubricating oil composition as claimed in claim 1 wherein said amine is a secondary amine.

10. A lubricating oil composition as claimed in claim 1 wherein said amine is a secondary amine containing, as a nucleus, a morpholine, a piperazine, a pyrrolidine, or a phenothiazine.

11. A lubricating oil composition as claimed in claim 1 wherein said minor effective viscosity index improving portion is 0.2–5 W%.

* * * * *